United States Patent

[11] 3,577,168

[72] Inventors William J. Tuten;
 Godfrey R. Gauld, Richmond, Ind.
[21] Appl. No. 739,011
[22] Filed June 21, 1968
[45] Patented May 4, 1971
[73] Assignee Avco Corporation
 Richmond, Va.

[54] LONG DELAY TIMING SYSTEM
 7 Claims, 4 Drawing Figs.
[52] U.S. Cl. ................................................. 307/293,
 307/252J, 317/231, 328/129
[51] Int. Cl. ............................................. H03k 17/28
[50] Field of Search ............................................. 307/293,
 252 (J); 328/129; 317/230, 231

[56] References Cited
 UNITED STATES PATENTS
 2,791,473 5/1957 Mattox ........................ 317/231X 3,444,439 5/1969 Hoeksema ................... 317/231
 OTHER REFERENCES
 ELECTRONICS Nov. 16, 1964 pp. 67— 71 " Simple Cell Competes With Complex Components" by H. Feitler

*Primary Examiner*—Donald D. Forrer
*Assistant Examiner*—John Zazworsky
*Attorneys*—Charles M. Hogan and Gary M. Gron ABSTRACT: The disclosure illustrates a longterm timing system comprising a battery coupled to an electrochemical cell through a pulsing circuit. The electrochemical cell is of the type that requires current flow above a minimum value to enable proper operation. The pulses from the pulsing circuit have a peak substantially greater than the minimum permissible current level but the pulses are substantially spaced in time. The resultant average current flow is then low enough so that the time at which the impedance of the electrochemical cell changes is greatly increased.

PATENTED MAY 4 1971 3,577,168

INVENTOR.
WILLIAM J. TUTEN
BY GODFREY R. GAULD

Charles M. Hogan
Gary M. Gron
ATTORNEYS.

3,577,168

LONG DELAY TIMING SYSTEM

The present invention relates to timing systems and more specifically to timing systems incorporating electrochemical cells.

The use of electrochemical cells to provide time delays is well known. These cells generally comprise an anode having a noble metal surface. A cathode, spaced from the anode in a liquid or solid electrolyte, is plated with silver. In a timing system the cell is connected to a source of current such as a battery through a resistor. A suitable detector device, responsive to changes in impedance across the cell, is adapted to provide a usable output signal for control or other purposes. To set the timing system a precise quantity of silver is plated on the anode by the application of a given quantity of current in a direction from the cathode to the anode. The cell is then in a set condition. The battery is then connected to the cell and current flow in the opposite direction will then gradually deplate the silver from the anode. Depending upon the current level and amount of silver originally on the anode, a given time will elapse until all of the silver is deplated from the anode, resulting in an increase in cell impedance. This increase is sensed by the detector to provide an output signal for actuating a time-delayed device or system. While the above approach is a highly simplified, compact reliable means of obtaining moderate time delays, e.g., several weeks, its use for extremely long time delays is substantially prevented by a number of problems.

One of the most significant problems confronting the use of the electrochemical cell for extremely long time delays is the fact that electrochemical cells require a current flow greater than a minimum value necessary for reliable operation. Below this level the cell may experience a catastrophic failure due to whisker or dendrite formations between the anode and the cathode. This whisker formation short circuits the cell, thereby effectively preventing the generation of an abrupt impedance increase. To overcome this problem it is necessary to substantially increase the instantaneous current level applied to the electrochemical cell, which will increase the current when a DC current source is used. In order to attain very large time delays in the order of months, the physical size of the electrochemical cell and the size of the battery supplying the current to the cell must be so great that the use of this arrangement is undesirable for a compact installation.

Accordingly, it is an object of the present invention to provide a highly compact, simplified and economical timing system which can produce time delays of extremely large magnitude.

The above ends are achieved by an improvement in a timing system comprising a source of direct current and an electrochemical cell of the type generally described above. The cell requires a minimum safe current to prevent formation of whiskers and short circuiting between its anode and cathode. A means is provided for converting the output of the direct current source into a series of current pulses, the pulses having instantaneous values substantially greater than the minimum safe operating current and a substantial time spacing therebetween. A means is provided for applying the pulses to the cell so that the quantity of current flow required to increase the impedance of the cell is attained after a very large time period and the resultant time average current flow is below the minimum permissible instantaneous current level.

The above and other related objects and features of the present invention will be apparent from a reading of the description of the disclosure shown in the accompanying drawing and the novelty thereof pointed out in the appended claims.

Figure 1:
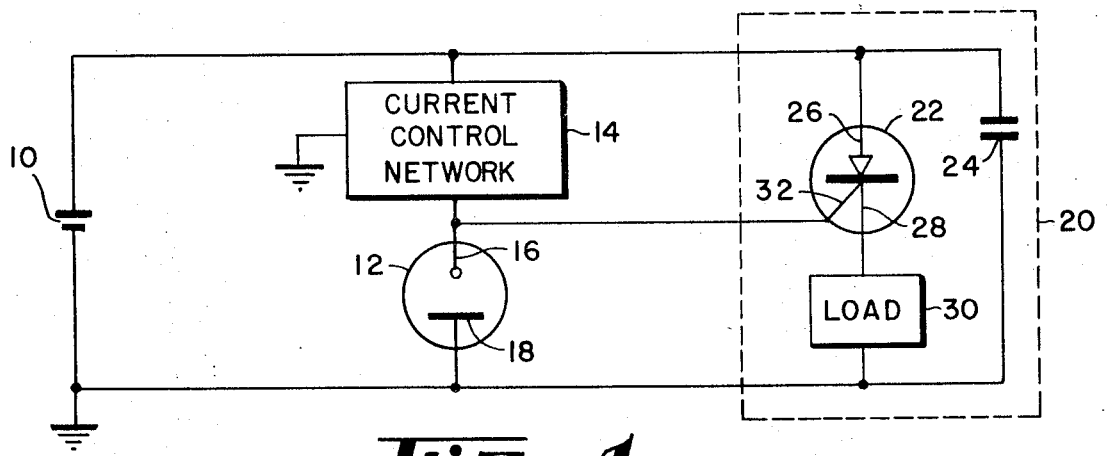
FIG. 1 is a schematic diagram of a timing circuit embodying the present invention.

Referring now to FIG. 1 there is shown a timing system comprising a battery 10 connected to an electrochemical cell 12 through a current control network 14. The electrochemical cell 12 comprises an anode 16 and a silver-plated cathode 18 in contact with an electrolyte. The impedance of the electrochemical cell is used by a detector network generally indicated by reference character 20 to provide a usable time-delayed signal. The detector network comprises a silicon-controlled rectifier (SCR) 22 and a capacitor 24 connected in parallel with the battery 10. The anode 26 of the SCR is connected to the positive terminal of the battery 10 and the cathode 28 is connected to the negative terminal of the battery through a load 30. The gate 32 of the SCR is connected to the anode 16 of the electrochemical cell 12.

Before the timing system is put into operation the electrochemical cell 12 is subjected to a reverse flow of current (usually from an external circuit) from the cathode to the anode to plate silver on the anode 16. The amount of silver plated on the anode is precisely selected by controlling the current and total time of current flow through the cell. In this condition the electrochemical cell is set and current flowing from the anode to the cathode will cause silver to be deplated from the anode.

While the silver is being deplated from the anode 16, the electrochemical cell 12 exhibits a relatively low impedance. As a result, the anode 16 of the electrochemical cell 12 and the gate 32 of the SCR are at the same potential as the cathode 18 of the electrochemical cell 12 and the cathode 28 of the SCR 22. During this condition of the gate 32 the flow of currents from the anode to the cathode of the SCR is prevented.

When all of the silver has been deplated from the anode 16 the impedance of the electrochemical cell 12 abruptly increases, thereby increasing the potential of anode 16 and the gate 32 substantially above the cathode 28 of the SCR. When this happens the gate 32 permits a sudden surge of current through the SCR 22. This surge of current is supplied in part by the battery and in part by discharge of energy from the capacitor 24 which is charged during the timing period. While the capacitor 24 is not necessary, it is frequently used to obtain current flows through the load 30 which are fairly large in magnitude. The current flow through the load 30 may be used for a relay, an igniter, or any other device desired to be actuated by a time-delayed signal.

The electrochemical cell 12 may be one of a number of cells particularly adapted for this purpose. Cells that are useful for this purpose are Model Numbers 582, 583-500, 585 and 586 manufactured by the Gibbs Manufacturing and Research Corporation, Janesville, Wisc.

The timing period for a cell of the above type is determined by the amount of silver initially plated on the anode and the average current flow used to deplate the silver from the anode. In determining the upper limits of the time-delay range, the physical size of the cell and the average current flow through the cell become important.

In the first place, a lengthening of the time period by reducing the current through the cell has a limit because there is a range of current flow within which the cell cannot properly function as described above. This range has been sometimes estimated as above zero and below about 2 microamps. Accordingly, the current level is maintained at about 5 microamps to insure against the formation of whiskers. Given this minimum safe operating current as a lower limit for the continuous flow of current, the time-delay period for an electrochemical cell in current systems can only be increased by enlarging the electrochemical cell to enable a greater amount of silver to be plated on the anode. The enlarged electrochemical cell generally prevents an objective of a miniaturized system. In addition, it takes an extraordinarily long time to plate the cell in a set condition because of the large amount of silver required to be plated on the anode.

Furthermore, the size of the battery required to have the current capacity over the estimated period of time is substantially increased. Maintaining the minimum safe operation current for an extended period of time is not the only factor that necessitates an increased battery size. In many installations the battery must be capable of producing the minimum current in a low temperature environment. Therefore the battery size must be further increased.

In accordance with the present invention the current flow through the electrochemical cell 12 is limited by the current control network 14 to a value well above the minimum safe operating level. At the same time, however, it generates an extremely low average current flow through the cell 12 to enable a substantial reduction in the size of the timing system components when they are used for extremely long time periods.

Figure 2:
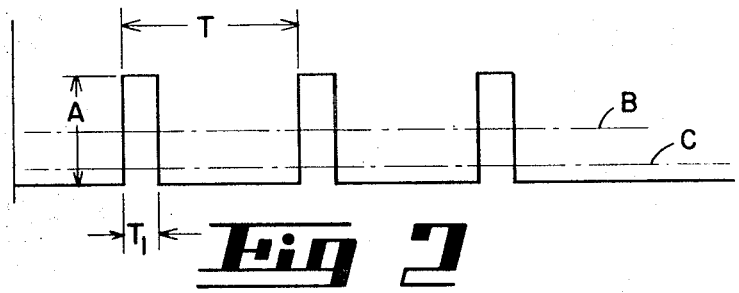
FIG. 2 is a waveform output of a pulsing circuit incorporated in the timing system of FIG. 1.

This end is accomplished by providing in the current control network 14 a circuit which converts the direct current available from the battery 10 to a series of current pulses, as shown in FIG. 2. These current pulses have peak values A which are substantially above the minimum safe operating current B which enables proper operation of the cell 12. Likewise, the zero current flow between pulses cannot cause the formation of whiskers. The spacing between the pulses T is substantially greater than the width of the pulses $T_1$ and the resultant average current through the cell is at level C. It is apparent that this level is substantially lower than the minimum safe operating current B. It should be noted in the beginning and the end of each pulse the current may be for a time below the minimum safe operating current. However, the time over which the current is at this level is so small as to have an insignificant effect on the formation of whiskers or dendrites across the anode and the cathode.

For a given amount of silver on the anode 16 the time-delay period for the cell 12 is increased by a factor of $T/T_1$. Thus it can be seen for a circuit having widely spaced pulses that the time period for the cell may be tremendously increased. For a typical system, the time period may be increased by a factor of 100. Furthermore, the width between the pulses may be made variable by suitable adjusting circuitry to control, within a wide range, the time-delay period for the system. It has been found that with the above system time delays up to 9 months may be realized with a high degree of reliability and accuracy.

Figure 3:
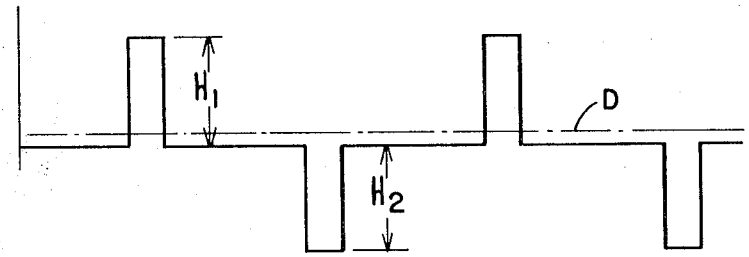
FIG. 3 is a waveform of an alternate configuration or the pulsing circuit of FIG. 1.

In order to have an even greater time period the current through the cell 12 may be controlled by a pulsing network which alternately passes pulses which have opposite polarity, as shown in FIG. 3. In this system the pulse height $H_1$ in a direction tending to deplate the anode 16 is slightly higher than the pulse height $H_2$ of the opposite polarity pulse which tends to plate the anode. The resultant average current D passing through the cell to deplate the anode 16 is then such a low value that the system may have time delays which approach the storage life of presently available batteries.

Figure 4:
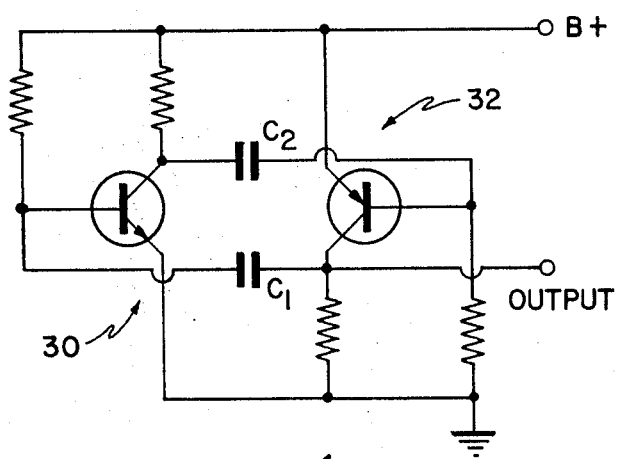
FIG. 4 is an exemplary schematic diagram for a low power drain pulsing circuit which may be incorporated in the system of FIG. 1.

FIG. 4 illustrates a relaxation oscillator comprising two solid-state amplifying devices 30, 32 which alternately conduct and cutoff as the oscillator switches from one state to the other.

The first configuration 30 employs an NPN transistor and the second configuration 32 employs a PNP transistor. As a result, both conduct at the same time for part of the cycle and both are cutoff for the remainder of the cycle. When the conducting time is made very short compared to the nonconductive time, the average power used is substantially minimized.

The oscillator of FIG. 4 has a frequency of about 40 cycles per second. It operates at 0.6 supply voltage at a current of about 0.015 $\mu A$ and has a total power consumption of 0.009 $\mu$ watts. The frequency and resultant $T/T_1$ ratio may be varied for a particular time delay by making capacitors $C_1$ and $C_2$ variable.

While many pulse networks may be utilized to control the current through the cell 12, the relaxation oscillator described below is especially suitable because of its low power drain on the battery 10.

The use of the pulsing network to control the current flow through the electrochemical cell enables a substantial increase in the maximum possible timing period. At the same time, a relatively small electrochemical cell can be used for rather large time periods. With this system the current requirements of the battery are substantially lowered, thereby making it possible to use a relatively small battery. Furthermore, the system is not as susceptible to low temperature effects on the battery since the current pulses exist for such a small percentage of the overall time period.

The timing system described above is not limited to use with a silicon-controlled rectifier type of detector but may be used with any number of widely available detectors to produce usable output signals. While the preferred embodiment has been described, it will be apparent to those skilled in the art that it may be practiced in other forms without departing from the spirit of the present invention. Accordingly, the scope of the invention is to be determined solely by the appended claims.

Having described the invention, what is claimed as novel and desired to be secured by Letters Patent of the United States is:

We claim:

1. A timing system comprising:
a source of direct current;
an electrochemical cell including an anode having a given amount of material plated thereof and a cathode on which the material is plated in response to current flow through said electrochemical cell, all of said material being plated on the cathode at a point in time after a predetermined quantity of current flow, thereby causing an abrupt substantial increase in impedance, said electrochemical cell requiring a current level thereacross above a minimum safe operating current to prevent formation of whiskers and short circuiting between the anode and the cathode;
means for converting the output of said direct current source into a series of current pulses, said pulses having peak values substantially greater than said minimum safe operating current and a substantial and equal predetermined time spacing therebetween;
means for applying said pulses to said cell whereby the quantity of current flow required to increase the impedance of said cell is attained after a substantial time period; and
means for detecting the increase in impedance of said electrochemical cell for generating an output signal.

2. A timing system as in claim 1 wherein:
said current pulse means comprises means for establishing a predetermined ratio between the duration between adjacent pulses and the width thereof, whereby the time period increase for said timing system is proportional to said ratio.

3. A timing system as in claim 2 wherein:
said current pulse means comprises means for adjustably varying the ratio between the duration between adjacent pulses and the pulse width for varying the time period after which said impedance increase takes place.

4. A timing system as in claim 1 wherein:
said electrochemical cell has a volume generally proportional to the quantity of current flow required to plate material on the cathode,
said current pulse means being adapted to generate current pulses sufficiently short in duration and sufficiently spaced so that the resultant average current value is a relatively small value whereby the size of said cell may be minimized and the time necessary to plate the predetermined amount of material on the anode is minimized.

5. A timing system as in claim 4 wherein said current pulse means requires a relatively low expenditure of power whereby the timing system may be used for extremely long time periods.

6. A timing system as in claim 5 wherein said current pulse means comprises a relaxation oscillator.

7. Apparatus as in claim 1 wherein said detecting means is a voltage detector.

PO-1050
(5/69)

UNITED STATES PATENT OFFICE
CERTIFICATE OF CORRECTION

Patent No. 3,577,168          Dated May 4, 1971

Inventor(s) WILLIAM J. TUTEN and GODFREY R. GAULD

It is certified that error appears in the above-identified patent and that said Letters Patent are hereby corrected as shown below:

Page 1, the lines reading "[73] Assignee Avco Corporation Richmond, Va."
should read -- [73] Assignee Avco Corporation Richmond, Ind. --

Signed and sealed this 15th day of January 1974.

(SEAL)
Attest:

EDWARD M. FLETCHER, JR.
Attesting Officer

RENE D. TEGTMEYER
Acting Commissioner of Patents